«12» United States Patent
Clucas et al.

(10) Patent No.: US 8,964,031 B2
(45) Date of Patent: Feb. 24, 2015

(54) METHOD AND SYSTEM FOR MEASURING THE SPEED OF A VEHICLE (75) Inventors: Alan Clucas, Southhampton (GB); Brian David Vincent Smith, Worthing (GB)

(73) Assignee: 3M Innovative Properties Company, St. Paul, MN (US)

( * ) Notice: Subject to any disclaimer, the term of this patent is extended or adjusted under 35 U.S.C. 154(b) by 494 days.

(21) Appl. No.: 13/390,429

(22) PCT Filed: Aug. 17, 2010

(86) PCT No.: PCT/GB2010/001556
§ 371 (c)(1),
(2), (4) Date: Apr. 24, 2012

(87) PCT Pub. No.: WO2011/020997
PCT Pub. Date: Feb. 24, 2011

(65) Prior Publication Data
US 2012/0206602 A1    Aug. 16, 2012

(30) Foreign Application Priority Data

Aug. 17, 2009   (GB) .................................. 0914396.7

(51) Int. Cl.
*H04N 7/18* (2006.01)
*G06T 7/20* (2006.01)
*G08G 1/052* (2006.01)

(52) U.S. Cl.
CPC .............. *G06T 7/2033* (2013.01); *G08G 1/052* (2013.01); *G06T 2207/10016* (2013.01); *G06T 2207/30236* (2013.01)
USPC .......................................................... 348/143

(58) Field of Classification Search
CPC ....... H04N 7/18; G06K 9/00771; G06K 9/00; G08B 13/196
See application file for complete search history.

(56) References Cited

U.S. PATENT DOCUMENTS

| 3,120,992 | A  | 2/1964  | Hollingsworth |
| 5,402,118 | A  | 3/1995  | Aoki          |
| 5,467,634 | A  | 11/1995 | Brady et al.  |
| 5,734,337 | A  | 3/1998  | Kupersmit     |
| 5,742,699 | A  | 4/1998  | Adkins        |
| 6,690,294 | B1 | 2/2004  | Zierden       |

FOREIGN PATENT DOCUMENTS

| CN | 101105893 A     | 1/2008  |
| JP | 2006-329776 A   | 12/2006 |
| WO | WO 2008/088409 A2 | 7/2008 |

OTHER PUBLICATIONS

Sharpe, R. "Method of Determining Vehicle Speed with a Camera Capable of Optical Character Recognition", IP. Com Journal, IP . Com Inc., Aug. 1, 2006, pp. 2-3.
Tian, J. et al. "Vehicle Speed Measurement Based on Images Energy", Information Processing, 2009, Asia-Pacific Conference, Jul. 18, 2009, pp. 124-127.
International Search Report for corresponding International Patent Application No. PCT/GB2010/001556 mailed Dec. 7, 2010.
UK Examination Report for corresponding UK Patent Application No. 0914396.7 mailed Oct. 27, 2009.

*Primary Examiner* — Mehrdad Dastouri
*Assistant Examiner* — Kristin Dobbs (57) ABSTRACT A system for measuring the speed of a vehicle includes: one or more cameras (200) for capturing images of vehicles (100) on a road (50); timing means for timing the capture of the images; a processor arranged to: identify in the captured images a feature (150) of the vehicle; calculate the size in pixels of the feature (150) of the vehicle in two or more of the captured images; and determine the speed of the vehicle (100) based at least in part on the calculated sizes and the times at which each image was captured.

29 Claims, 9 Drawing Sheets

Y- position of plate in image

FIG. 9

Y- position of plate in image

Interpolated 'r' values from 'p' and 'q' values

FIG. 10

Y- position of plate in image

METHOD AND SYSTEM FOR MEASURING THE SPEED OF A VEHICLE

This application is a National Stage Application of PCT/GB2010/001556, filed 17 Aug. 2010, which claims benefit of Serial No. 0914396.7, filed 17 Aug. 2009 in the United Kingdom and which applications are incorporated herein by reference. To the extent appropriate, a claim of priority is made to each of the above disclosed applications.

TECHNICAL FIELD

The present invention relates to a method and system for determining the speed of a vehicle from captured images thereof. Preferably, only one camera is used to capture the images. However, two or more cameras could be used to capture the images.

BACKGROUND

Conventionally, vehicle speeds are measured using active means such as a "radar gun". A radar gun emits a wave of a known frequency which reflects from a moving target back to a sensor on the radar gun. The device measures the Doppler effect caused by the motion of the vehicle, and uses this to estimate the speed of the vehicle. This measurement can be made inaccurate by the presence of other vehicles in close proximity to the target; the emitted wave cannot distinguish between vehicles. Furthermore, this approach will only measure the relative speed between the target and the emitter/sensor, and not the speed of the vehicle relative to the road on which it is travelling, which could be at an angle to the direction of the emitted wave.

There is therefore a need to provide a method of determining the speed of a vehicle relative to the road on which it is travelling that can preferably distinguish between multiple vehicles.

According to a first aspect of the present invention, there is provided a system for measuring the speed of a vehicle according to claim 1.

According to a second aspect of the present invention, there is provided a method of measuring the speed of a vehicle according to claim 18.

DESCRIPTION OF THE DRAWINGS

The present invention will now be described, by way of example only, with reference to the accompanying drawings, in which.

DETAILED DESCRIPTION

The following discloses a method of estimating the speed of a vehicle from a sequence of two or more images.

As is well known, distant objects of a certain size appear smaller than nearby objects of the same size. This effect corresponds to a variation in the size of an object in the image plane, such that the size in pixels of an object in an image is indicative of the distance from the object to the camera.

For vehicles travelling along a road, the Euclidean distance between a vehicle and a camera is indicative of the geodesic distance along the road therebetween (a one-to-one mapping in the case of a camera facing along a single lane road).

The speed of a vehicle can therefore be determined by mapping from the size in pixels of an object in neighbouring frames of a sequence of captured images, to distances along the road corresponding with those sizes, and then multiplying the change in distance by the frame rate. Alternatively, subsequent but spaced apart frames may be used and the change in distance divided by the time between frames.

Such methods may comprise the steps of: detection of a licence plate in an image; determination of the size of the licence plate; and mapping from size to distance along the road.

Methods of detecting a licence plate in an image are well known in the field of automatic licence plate recognition systems. The output of such a detector may identify the pixels of an image which represent the licence plate (for example, by outputting a binary image where a pixel value of 1 corresponds with the presence of a licence plate a pixel value of 0 corresponds with a lack of a licence plate). The licence plate detector may be implemented as part of an automatic licence plate recognition system, or as a standalone device.

From the identification of pixels in the image that correspond to the licence plate, a number of different size measurements can be taken. For example, a length can be measured; the width in pixels of the licence plate can be calculated, or the length of a diagonal between opposite corners can be determined. Alternatively, the size may be the area in pixels of the licence plate. In the following disclosure, the term "size" is intended to cover both lengths and areas.

Also the location of the licence plate in the image can be determined. The location can be defined in a number of ways. For example, the location of the collection of pixels identified as forming a licence plate can be defined as the centroid of the pixels.

The term "vertical" used with reference to a position in a captured image means the direction in the image plane which corresponds to a change in vertical position of an object in the real-world.

Figure 1:
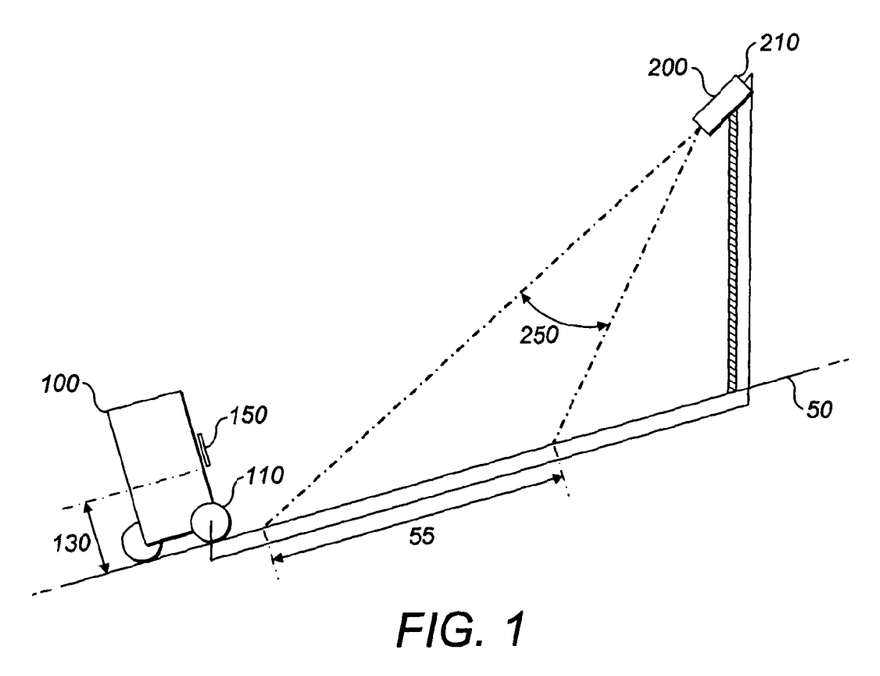
FIG. 1 shows a schematic representation of the apparatus used for the calibration of a camera.

FIG. 1 shows a schematic representation of the calibration of a speed measuring system which uses a camera 200 to determine the speed of vehicles travelling along the road 50.

In this first embodiment, the camera 200 is located above the road 50 such that it is looking along the road 50 and is centred above it. The camera 200 has a field of view 250 covering a length of the road 55.

The camera 200 comprises an input 210, which receives a signal from a distance measuring device 110.

In this embodiment, the distance measuring device 110 is a wheel with a sensor that is arranged to determine when the wheel has rolled a predetermined distance (for example, every 10 cm) and outputs a signal each time that distance has been travelled. Therefore, the signal is indicative of the distance that the calibration vehicle 100 has travelled along the road. In an alternative embodiment the distance measuring device could be a laser measurement device with an RS232 or Ethernet communications link (or an infrared or radio-frequency broadcast link) to the camera.

The calibration vehicle 100 has a feature, e.g. a licence plate 150, at a height 130 from the road 50 (when in use).

As the calibration vehicle 100 travels along the length of road 55, the camera 200 captures images of the vehicle 100 including the licence plate 150. These images can be captured each time the calibration vehicle 100 has moved a certain distance or, alternatively, at predetermined times.

For each captured image, the licence plate 150 is detected and its size (a length or an area) in pixels is determined.

The size in pixels of the licence plate 150 is recorded, along with the associated distance along the road from the camera (that is, from the point on the road directly below the camera—for a flat road with zero gradient this will be the horizontal distance from the camera). It should be noted that the point from which distances are calculated is arbitrary, however the location directly below the camera is a convenient point.

The height of the plate 130 can affect the range of distances from the camera over which the licence plate is visible in the image plane. The licence plate is repositioned at a different height 130, and the capture of images is repeated. A number of image sequences can be captured for plates at varying heights 130 and the size of the plate in the image and the distance along the road from the calibration vehicle to the camera corresponding with each sequence recorded.

Figure 2A:
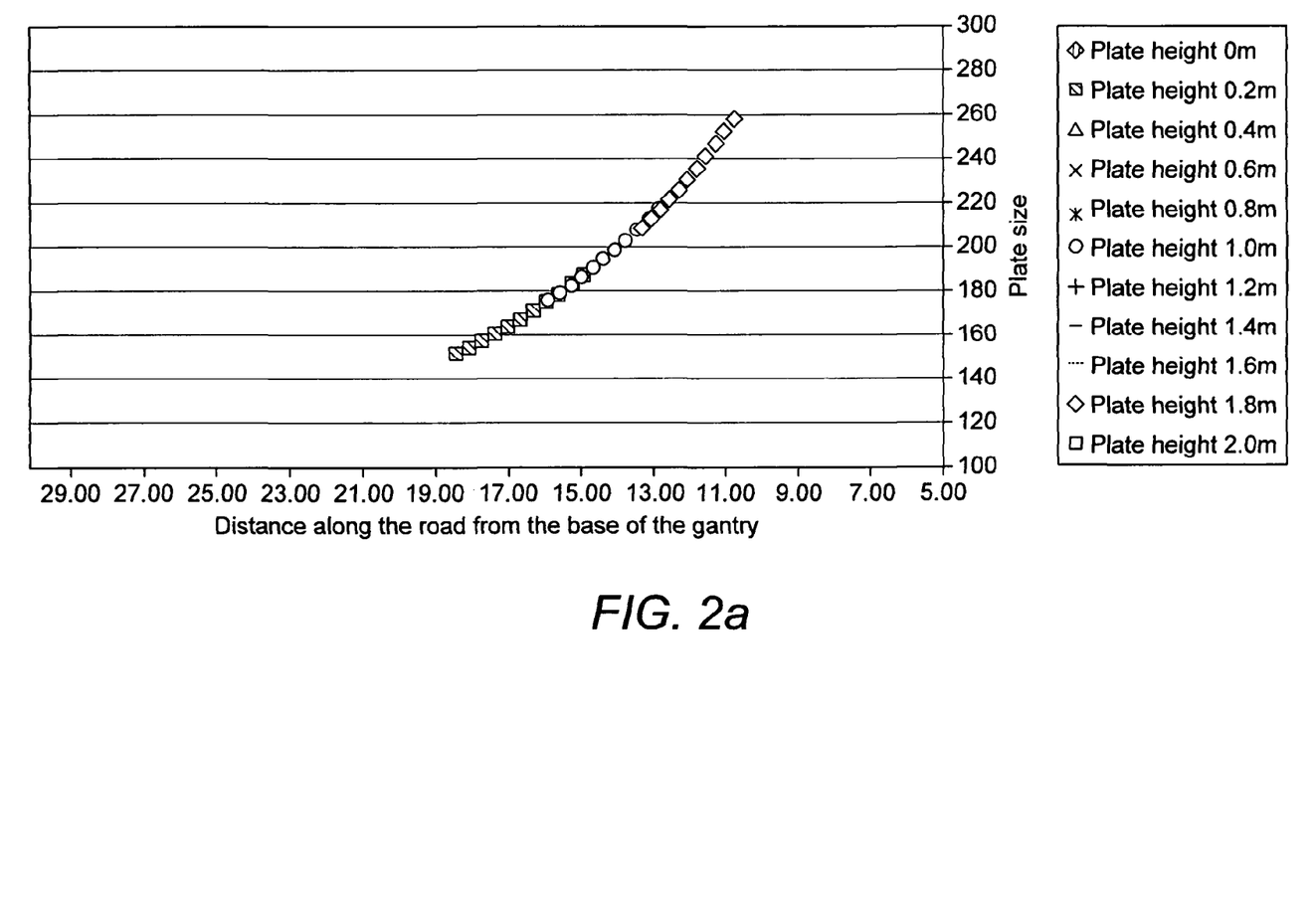
FIG. 2a shows a graph of distance along the road, from the camera (X-axis) to a vehicle, plotted against licence plate size in pixels (Y-axis) for different heights of licence plate.

FIG. 2a shows results for different heights of licence plate overlaid on a graph of distance along the road from the camera (X-axis) to a vehicle plotted against licence plate size in pixels (Y-axis). In this graph, licence plate size is measured as the width of the licence plate.

As can be seen from the graph the results show a monotonic relationship, for each height, between plate size and horizontal distance from camera. Therefore, for a known plate height the plate size directly maps to a distance from the point directly below the camera without ambiguity (i.e. there are no two distances that correspond to the same plate size for a given height of licence plate).

Furthermore, it can be seen that height of plate only has a small effect on the licence plate size, and therefore can optionally be ignored in some embodiments (in particular, when the licence plate is far from the camera; the greater the horizontal distance from the camera to the vehicle, the smaller the effect of licence plate height). Such embodiments may be calibrated using an average height of licence plate or by using data from licence plates of various heights and disregarding the height information.

The shape of the graph for each height of licence plate 150 is determined by factors including the gradient of the road 50, the position of the camera 200 relative to the road 50, the distortion caused by the lens of the camera 200.

Although in this embodiment the camera 200 is positioned directly above the road 50 and faces along the road 50, this is not essential, since the shape of the graph can also take account of other factors (notably, the parallax effect). In such cases, the distance along the road being determined may be measured from the point along the road that is closest to the camera.

In fact, the camera can be located anywhere that provides a view of the vehicle licence plates at two or more locations.

In an alternative arrangement, the camera 200 is mounted on a pole at the side of the road 50, and is directed at an angle to the road 50, such that a length of the road 55 falls within the field of view of the camera.

Whilst the above discloses the measurement of the size of a licence plate 150, it is to be noted that any suitable feature can be used. For example, the vehicle itself could be the feature. Image processing methods can be used to detect the wing mirrors of a car, and the size of the car could be defined as the distance between the detected wing mirrors. Alternatively, the feature could be the front or rear windscreens, or bumpers.

Using a graph of the type shown in FIG. 2a, it is possible to determine the location along the road of a vehicle solely from the size of a feature detected in an image. This can be done by linearly interpolating between the points in the graph. Alternatively, known techniques could be employed to fit a curve or a spline to the data to produce a function that could be used either to generate a look-up table, or directly applied to the measured size data, to thereby output a corresponding distance. For example, the function could be a piece-wise linear approximation to a graph such as that shown in FIG. 2a, i.e. a collection of straight lines extending between the data points. It should also be noted that since size in FIG. 2a is the width of the feature, which is inversely proportional to the distance from the camera 200, the line of best fit may have the form $(1/y) = m*x + c$.

Although the above description sets out a method in which size alone is used to determine the distance to a vehicle, it is possible to improve accuracy in some cases by also using positional information.

Figure 3:
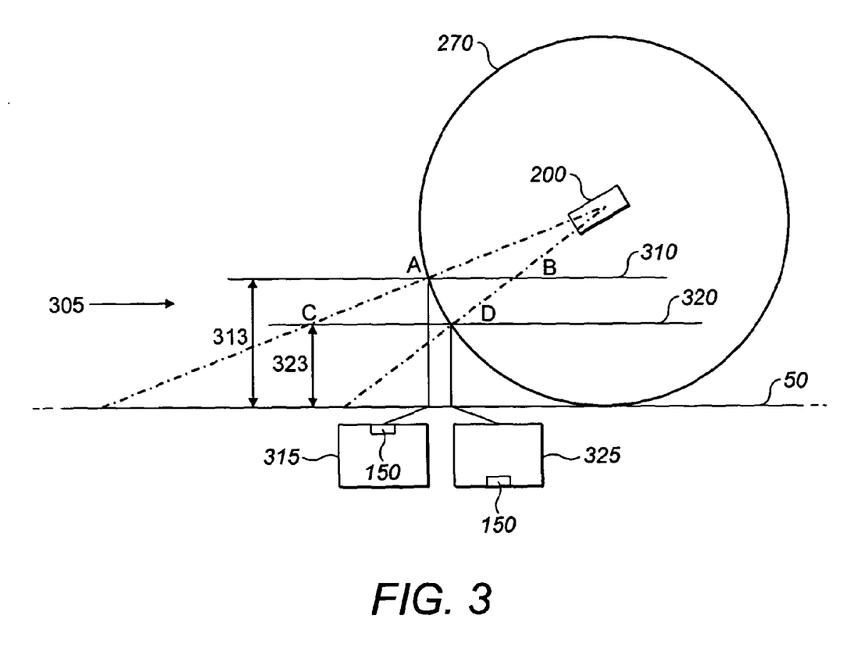
FIG. 3 shows a schematic representation of the effect of licence plate height on the image plane.

FIG. 3 demonstrates the principle by which a feature height of the licence plate is relevant in the extreme case in which the image is captured very close to the camera.

In FIG. 3, a vehicle (not shown) having a licence plate 150 moves in the direction of arrow 305 towards camera 200 along road 50.

If the licence plate 150 is at a height 313, then it will travel along line 310. Image 315 is captured by the camera 200 when the licence plate 150 is at position A.

If the licence plate 150 is at a height 323, then it will travel along line 320. Image 325 is captured by the camera 200 when the licence plate 150 is at position D.

At a distance from the camera 200 corresponding to the radius of circle 270, the licence plate 150 will appear in a captured image to be of a particular size. Circle 270 meets line 310 at point A and meets line 320 at point D. Since in each case the licence plate 150 is the same distance from the camera, it will appear to be the same size in image 315 as in image 325. However, the different height of the licence plate 150 in each case results in a different vertical position in each image 315, 325.

Therefore, whilst in this extreme case there can be seen a significant difference in horizontal position between points A and D, this can be disambiguated by taking into consideration the vertical position in the captured image 315, 325.

It should be noted for completeness that although the vertical position in an image of a licence plate moving along line 310 at point A is the same as the vertical position in an image of a licence plate moving along line 320 at point C, images captured of the licence plate 150 at each of these points will lead to a different size of licence plate 150 in each image.

Therefore, there is a one-to-one mapping from the measurements of vertical position in the captured image and size of the feature in the captured image to the position along the road.

In situations in which the height of a licence plate in the real world has a significant influence on the size of a licence plate in the image plane, a look-up table could be generated with an additional input (in addition to size of licence plate) for the vertical position of the licence plate in the image (and optionally, in the case of a multi-lane road, an additional input for the transverse position).

Figure 2B:
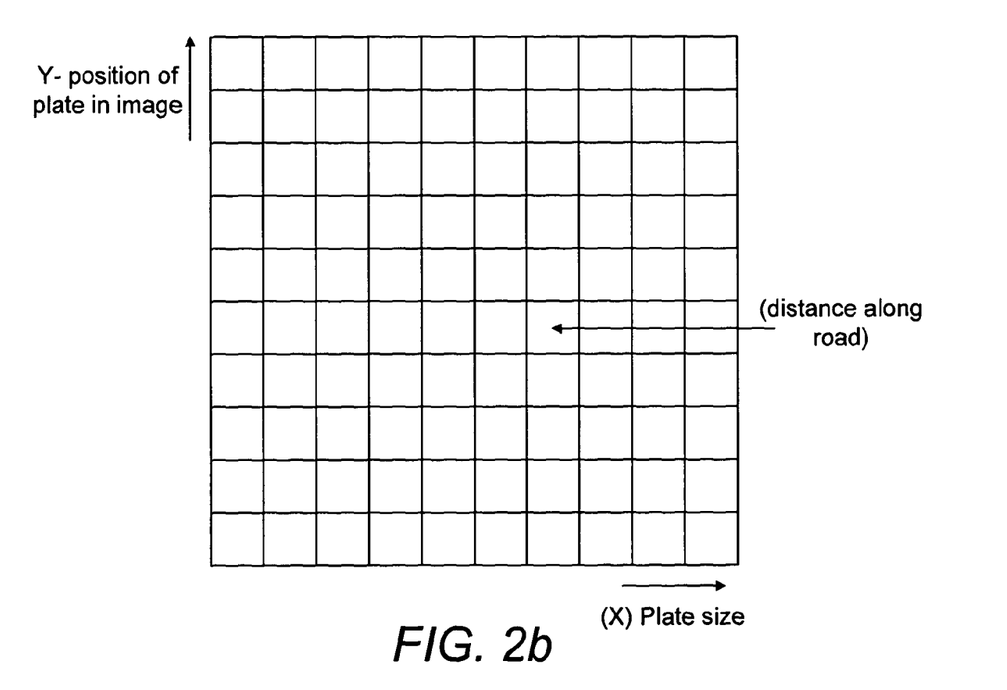
FIG. 2b shows a table of distances along the road, from the camera to a vehicle, indexed by against licence plate size in pixels (X) and the vertical position (Y) of the licence plate in the image.

FIG. 2b shows a table with plate size in an image on the X-axis and Y-position (i.e. vertical height) of the plate in an image on the Y-axis. Each entry in the table relates to distance along the road from the camera taking the image for a plate with plate size, X, and vertical position in the image, Y.

Each combination of vertical (Y) position in the image and plate size (X) relates to a unique point in space, which can be correlated with a unique distance along the road from the camera. For a given site a "site-table" of information, such as that shown in FIG. 2b, is acquired, correlating licence plates size and vertical position in the image to measured distances from the camera.

Typically the data capture is repeated with the licence plate fixed at incremental heights on the trolley, from 100 mm to 2.1 m. The measured distance along the road is stored in a two-dimensional look-up table having as indices the vertical positions of the licence plate in the image and the plate size. Mathematical interpolation could be applied to specific taken measurements to fill the look-up table without the need to take measurements at all points in the table as will be described below.

As an alternative to creating a look-up site-table, measured data could be used to determine a mathematical function which relates the vertical position of the plate in a captured image and the size of the plate in the captured image to the road distance from the camera.

The site-table (or mathematical function) for the site will take account of effects of site geometry, including road gradient and lens distortion.

In an alternative arrangement, the camera 200 is mounted on a pole at the side of the road 50, and is directed at an angle to the road 50, such that a length of the road 55 falls within the field of view of the camera. With such an arrangement, the horizontal position of the vehicle in the road may become relevant.

In such a case, the data acquisition procedure described above is repeated for known spacings transversely the road, e.g. at intervals of 250 mm. The populated table then becomes three-dimensional, with two indices being plate positions (i.e. x and y axis position) within the image and one index being plate size, the three indices correlating to a two dimensional (x distance along road; y distance across road) position in the road. The information is held for each plate height, so that a set of tables (or algorithms) is built up. A boom can be fitted to the calibration vehicle with multiple (e.g. 3) licence plates disposed across the boom, e.g. one for a centre lane and one for each of the other lanes of a three lane road, so that all the data can be acquired in one calibration run for each plate height.

Alternatively, a system could be trained for each lane, and a classifier used to determine from image data which system is appropriate for each vehicle detected.

Licence plates are of standard sizes and aspect ratios; these can be recognised automatically by the system. The data acquisition process could be repeated for each variant. Alternatively a conversion algorithm could be used to extrapolate from one licence plate variant to another, to avoid the need for data acquisition for each variant. When a captured image is subsequently processed (after initialisation of the system has been completed) then the licence plate variant in the image is determined (e.g. from its aspect ratio) and then a look-up table (or mathematical function) appropriate for the determined licence plate variant is selected. The system accuracy will depend on reliably equating the plate in the image with the appropriate calibrated look-up table or function; a smaller plate will make the vehicle appear to travel faster of the data for a larger plate is used. The system will filter out illegal, inappropriately sized, licence plates.

Using a table of the type shown in FIG. 2b, once the vertical position of licence plate is determined (and optionally, either horizontal position or the relevant lane, if the road has more than one), it is possible to determine the location along the road of a vehicle from the size of the licence plate detected in a captured image using an appropriate look-up table, or an appropriate mathematical function.

The distance measuring device 110 of the above embodiment is a wheel that calculates the distance rolled by the wheel. However, as mentioned above, other distance measuring devices known in the art can be used, such as a laser measuring device, or a GPS receiver (preferably using differential GPS) can be used to provide a GPS location measurement from which the relevant distance can be determined.

In a further aspect the invention provides a system for carrying out a method of measuring the speed of a vehicle.

Preferred embodiments of the system comprise: one or more cameras for capturing images of a vehicle travelling along a road; a processor for carrying out image processing tasks; and a memory for storing time and measurement data and a look-up table.

The following describes the modes of operation of the second embodiment. In this embodiment only size is used to determine the speed of the vehicle.

The system has two modes of operation, a calibration mode and a measurement mode. These modes can be carried out using the apparatus represented in FIG. 1.

Figure 4:
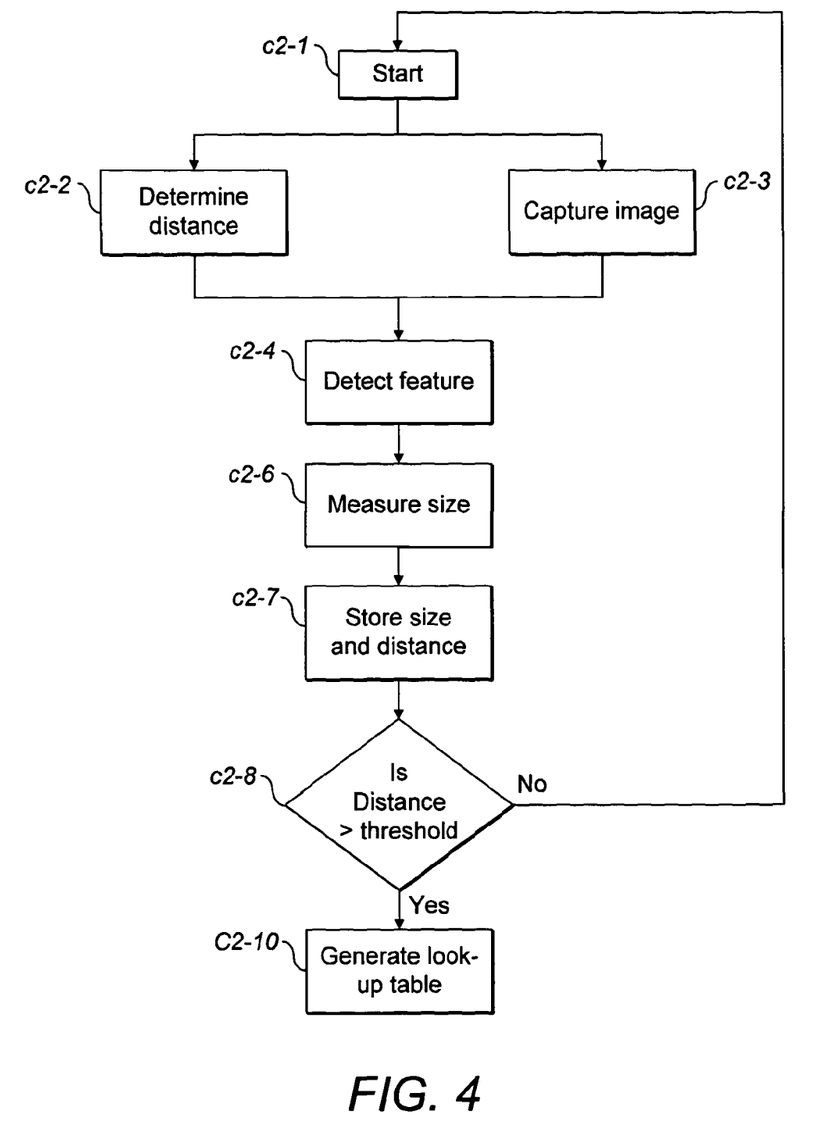
FIG. 4 shows a flow chart representing the steps of the calibration mode of the second embodiment.

A flow chart representing the steps of the calibration mode of the second embodiment, for a particular height of feature 150 is shown in FIG. 4.

The method steps carried out in the calibration mode of the second embodiment commence with step C2-1. The method starts in step C2-1 when a triggering signal is received at the camera 200 via input 210. This signal could be the output of the distance measuring device 110, which would indicate that the calibration vehicle 100 has begun measuring distance or when the feature 150 enters the field of view 250 of the camera 200; when the vehicle is on the length of road 55.

Alternatively, the method could start in response to a triggering clock signal from another device, such as a timer, so that the following steps are carried out periodically.

In step C2-2 the distance along the road 50 from the camera 200 to the calibration vehicle 100 is determined using a distance measuring device 110 on the calibration vehicle 100.

In step C2-3 the camera 200 captures an image.

Steps C2-2 and C2-3 may be carried out simultaneously (as shown in FIG. 4) so that the captured image corresponds exactly with the distance along the road at the time of image capture. What is important is that the distance measurement from step C2-2 corresponds with the position of the calibration vehicle 100 relative to a reference point when the image is captured.

In step C2-4 the processor carries out known image processing techniques to detect the feature 150 of the calibration vehicle 100 in the captured image.

In step C2-6 the processor determines the size of the feature 150 of the calibration vehicle 100 in the captured image.

In step C2-7 the processor stores in the memory the size of the feature 150 and the distance along the road from the calibration vehicle 100 to the camera 200.

In step C2-8 the processor checks whether the distance along the road is greater than a predetermined threshold that corresponds with the point at which the camera can no longer capture a suitable image of the feature 150 of the calibration vehicle 100. This may be the point at which the feature 150 is no longer within the field of view 250 of the camera 200, which corresponds with the length of road 55.

If not, then steps C2-1 to C2-8 are repeated. If so, step C2-10 is carried out.

In step C2-10 the processor generates a look-up table relating distance along the road 50 with size of feature 150.

Alternatively, in step C2-10 the processor can generate a function which provides the distance along the road 50 for a given size of feature 150.

In either alternative, the processor provides a way of determining distance based on the size of the feature 150.

Whilst step C2-10 is shown as being outside the loop provided by step C2-8, if each data point collected forms one entry in the look-up table this step can be carried out within the loop, for example immediately after step C2-7.

The calibration mode of the second embodiment may be carried out using a feature 150 at a height which corresponds with an average/standard height for that feature. Alternatively, a selection of heights of the feature on the calibration vehicle could be used and a curve fitted to all points of all heights.

Figure 5:
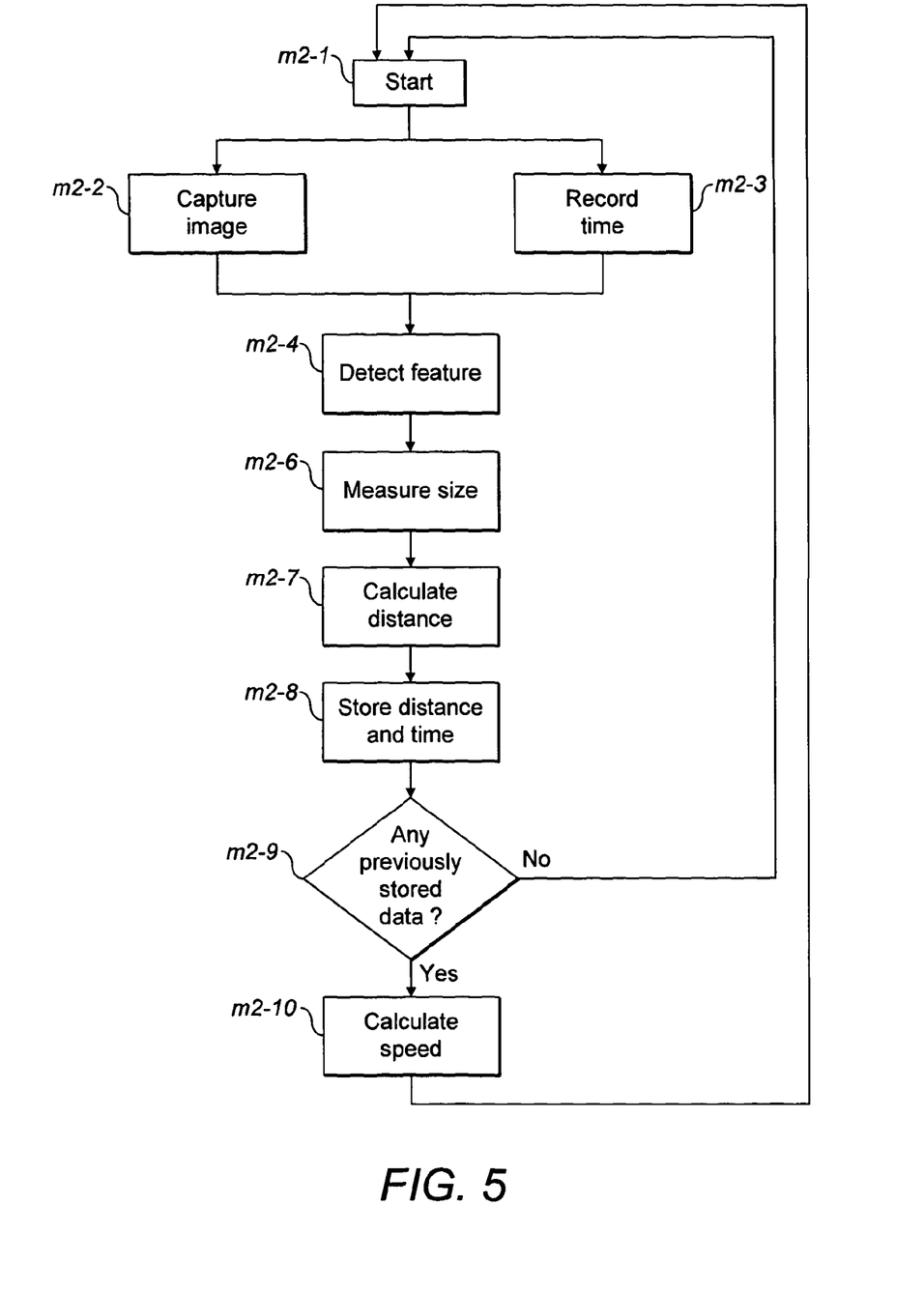
FIG. 5 shows a flow chart representing the steps of the measurement mode of the second embodiment.

A flow chart representing the steps of the measurement mode of the second embodiment is shown in FIG. 5.

The method carried out in the measurement mode is a repeated method commencing with step M2-1. The method starts, and is repeated, on a clock pulse.

Step M2-2 and M2-3 may be carried out simultaneously. In step M2-2 an image is captured by the camera 200, and in step M2-3 the time of image capture is recorded.

In step M2-4 the processor carries out known image processing techniques to detect the feature 150 of a vehicle 100 in the captured image.

In step M2-6 the processor determines the size of the feature 150 of the vehicle 100 in the captured image.

In step M2-7 the processor accesses a look-up table (or function), which has been generated in the calibration mode. The distance along the road of the vehicle is calculated using the look-up table. The input to the look-up table is the size of the feature as determined in step M2-6.

In step M2-8 the processor stores in the memory the distance along the road and the time of image capture.

In step M2-9 the processor accesses the memory to determine if an entry for the vehicle already exists. If not, the method returns to step M2-1. If so, step M2-10 is carried out.

In step M2-10 the processor determines the speed of the vehicle based on the stored distances and times. Specifically, the speed can be determined as the change in the vehicles distance along the road divided by the time period between the capture of the corresponding images.

The following describes a third embodiment, in which the vertical position of the detected feature 150 is considered in addition to size, for greater accuracy.

Figure 6:
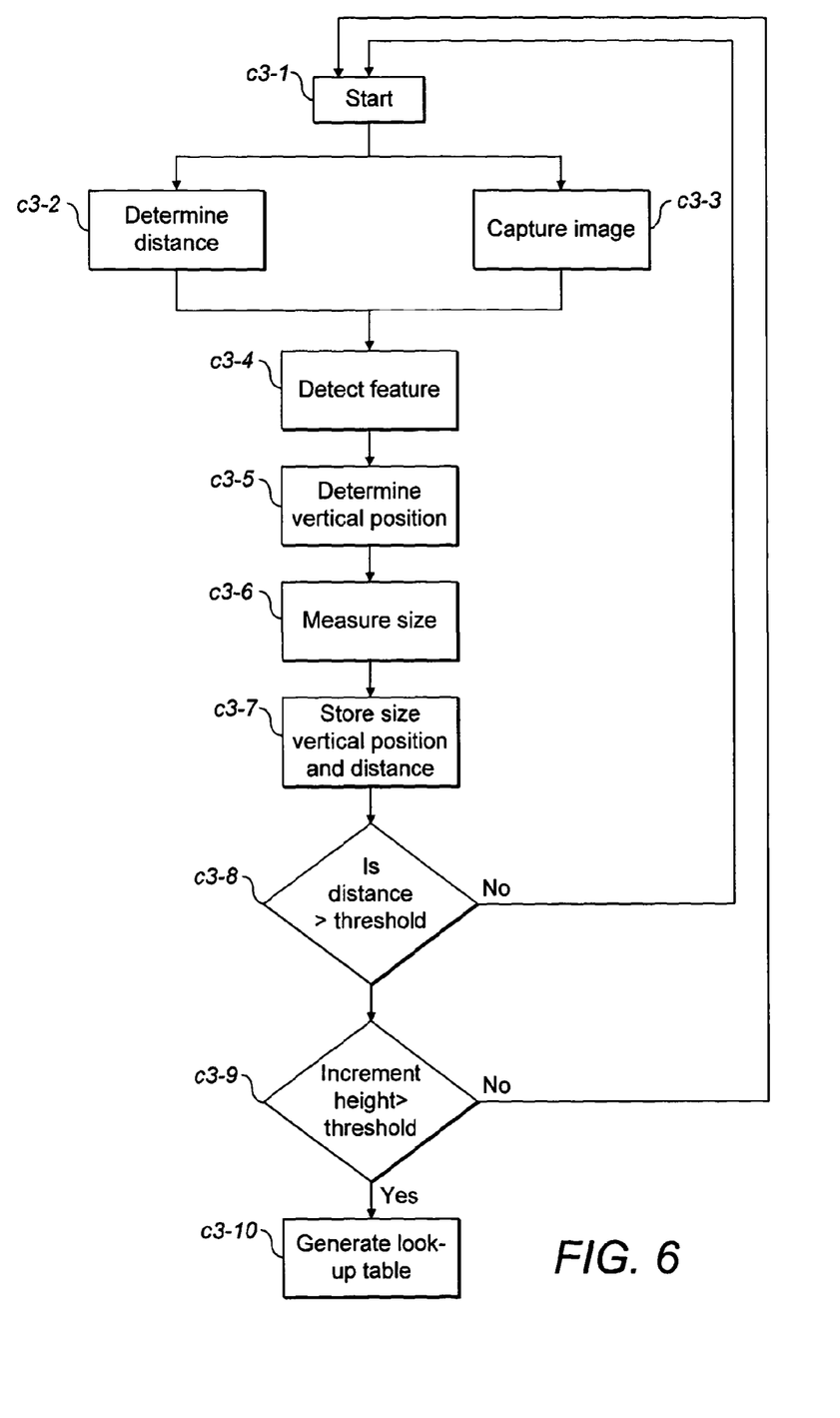
FIG. 6 shows a flow chart representing the steps of the calibration mode of the third embodiment.

A flow chart representing the steps of the calibration mode of the third embodiment is shown in FIG. 6.

Steps C3-1 to C3-4, C3-6, C3-8 are the same as steps C2-1 to C2-4, C2-6, C2-8.

In step C3-5 the processor determines the vertical position of the feature 150 in the captured image.

In step C3-7 the processor stores in the memory the size of the feature 150, the vertical position of the feature 150 in the captured image, and the distance along the road from the calibration vehicle 100 to the camera 200.

In step C3-9, the height of the feature 150 on the calibration vehicle 100 is incremented, and the process is repeated. Once the height of the feature 150 has exceeded the desired range, the process moves on to step C3-10.

In step C3-10 the processor generates a look-up table relating distance along the road 50 with two inputs, size of feature 150 and vertical position of feature 150 in the image.

As with the second embodiment, step C3-10 can generate either a look-up table, or a function. In either alternative, the processor provides a way of determining distance based on the size of the feature 150 and the vertical position of the feature 150 in the image. Furthermore, like step C2-10, step C3-10 can alternatively be located within the loop provided by step C3-8.

A function may be generated, to determine distance based on the two inputs, by fitting a surface to the data.

Alternatively, especially if the calibration data is dense enough, the function may simply be linear interpolation between the nearest data points. Equivalent techniques that are well known in the art can be used.

In preferred embodiments, the look-up table may be generated by the following process. Although in this embodiment, this process is entirely carried out as part of step C3-10, some of the sub-steps could be carried out at different points in the overall process.

Figure 8:
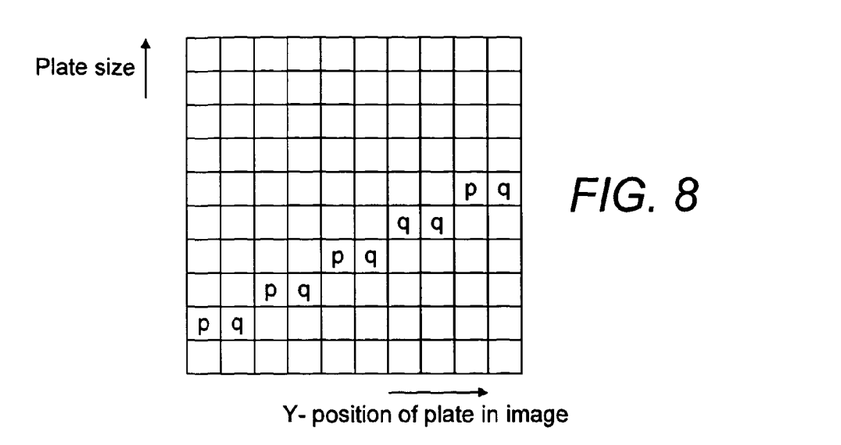
FIG. 8 shows a first step of populating a look-up table of the type shown in FIG. 2b.

Firstly, as shown in FIG. 8, for each height of the feature 150 on the calibration vehicle 100, the distance along the road 50 measured in step C3-2 is entered into the look-up table with an index determined as the vertical position of the feature 150 in the image measured in step C3-5 and the size of the feature 150 in the image measured in step C3-6. The measured data is represented in FIG. 8 by the letter "p".

Then, well known regression techniques are used to complete at least one entry on each row and column between the first and last entry for that height of feature 150, i.e. the entered data follows a "path" through the look-up table without any gaps. The regression can be linear or higher order. The data calculated by the regression is represented in FIG. 8 by the letter "q".

Figure 9:
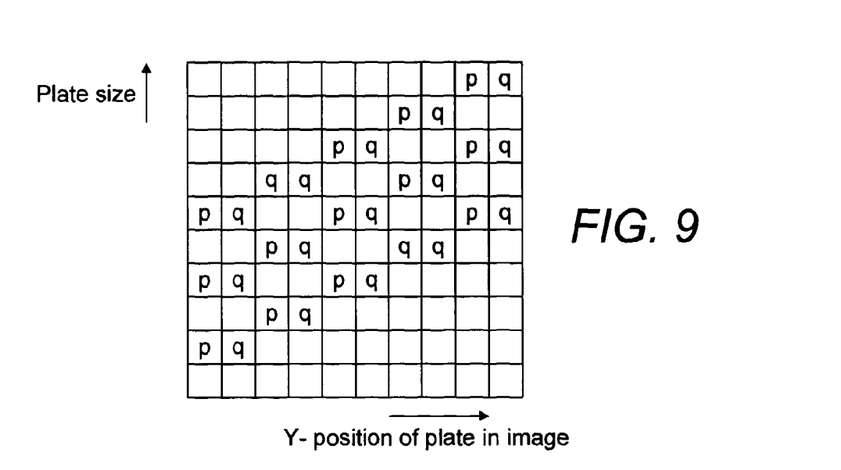
FIG. 9 shows a second step of populating a look-up table of the type shown in FIG. 2b.

Once data for one height of the feature 150 has been entered and regression carried out, these steps are be repeated for the data captured for the other heights of the feature 150. This leads to a partially completed table, such as that shown in FIG. 9.

Figure 10:
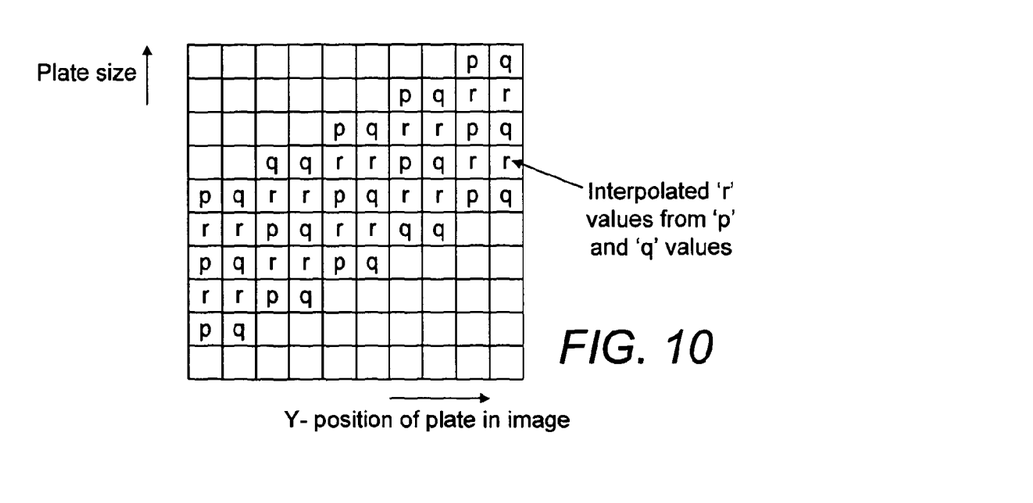
FIG. 10 shows a third step of populating a look-up table of the type shown in FIG. 2b.

Finally, further regression techniques can fill the gaps between the "paths" through the look-up table. These values are represented in FIG. 10 by the letter "r".

Optionally, the table can be stored using sparse-table techniques.

Figure 7:
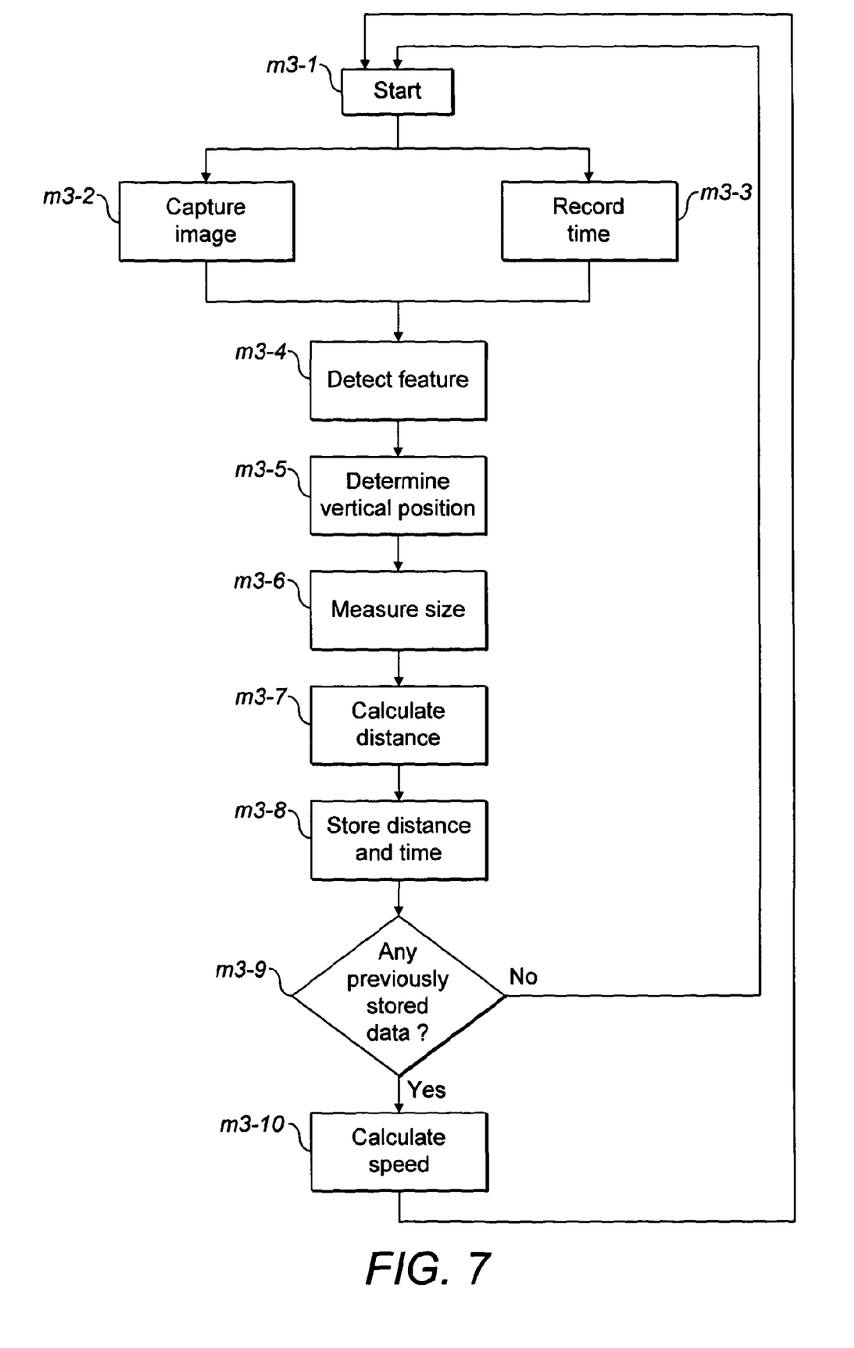
FIG. 7 shows a flow chart representing the steps of the measurement mode of the third embodiment.

A flow chart representing the steps of the measurement mode of the third embodiment is shown in FIG. 7.

Steps M3-1 to M3-4, M3-6, and M3-8 to M3-10 are the same as steps M2-1 to M2-4, M2-6, and M2-8 to M2-10.

In step M3-5 the processor determines the vertical position of the feature 150 in the captured image.

In step M3-7 the processor accesses a look-up table (or function), which has been generated in the calibration mode. The distance along the road of the vehicle is calculated using the look-up table. The inputs to the look-up table are the size of the feature and the vertical position of the feature.

The above disclosure assumes the simplest scenario of only a single vehicle in the field of view of the camera. However, the disclosure can be applied to the situation in which multiple vehicles are present at any one time, simply by applying known tracking techniques, such as a Kalman filter or a particle filter, to the sequence of captured images to enable the system to determine correspondences between moving vehicles appearing in each captured image.

In the preferred embodiment in which the measured feature is a licence plate, it is also possible to apply known automatic licence plate recognition techniques to read the registration number on the licence plate in each image and thereby track a vehicle from one frame to the next on this basis. In such an embodiment, in the measurement mode the registration number for each vehicle can be stored in step M2-8 or M3-8 along with the other parameters, and in step M2-9 or M3-9 the processor can check for any previously stored data for that vehicle.

The use of licence plates (or another feature that uniquely identifies the vehicle) and the resulting ability of the system to distinguish between vehicles enables the use of multiple cameras to determine the speed of a vehicle. For example, each camera could have an associated look-up table that relates the size of a licence plate to the distance along the road from a respective reference point. The distance travelled by the vehicle in the time between the capture of the images by each camera can be calculated using the distances along the road from the respective reference points for each camera and the known fixed distance between the reference points.

The embodiments above have disclosed methods in which speed is determined by first obtaining a distance from the size of a feature and then using the distance to calculate speed. Whilst this method if preferred for the flexibility in selecting appropriate images, it is within the capabilities of one skilled in the art to generate a look-up table having two inputs, for the size of a feature measured from each of two images captured at separate times that are a predetermined period apart, that would directly output a measure of the speed. This can even be carried out for a system having multiple cameras.

A look-up table could even be generated with an additional input for vertical position in each image, i.e. a look-up table formed as a matrix of matrices, i.e. a four-dimensional tensor.

The above disclosed methods can be applied to a road having multiple lanes by generating a look-up table or function relating distance along the road to size of feature for each lane individually. Such an embodiment would utilise known tracking/recognition methods for determining in which lane the car is located.

In the case of a vehicle that changes lanes between subsequent image captures, the distance along the road corresponding to each image capture can be determined. Either the speed can be estimated from the variation in distance along the road, or simple trigonometry can be applied to take into account the horizontal (lane-wise) displacement in the intervening period. In applications involving the enforcement of speed limits, it may be preferable to use the former, since this would provide an underestimate of speed.

Furthermore, if the look-up table is extended by two more dimensions, the horizontal positions of the feature 150 in each image can be used as inputs. This would remove any ambiguity cause by wide roads/lanes, which could be significant if the camera is directed at a large angle relative to the road. The look-up table would be calibrated, as mentioned above, using different horizontal positions (in the real-world) of the calibration vehicle, or a calibration vehicle with a plurality of licence plates at different horizontal positions (e.g. one centred on the lane and one each at the leftmost and rightmost extremes of the lane).

The disclosed speed determination method can be used in a standalone system, or can be incorporated into a standard automatic licence plate recognition system such as a system for recording the licence plates of cars entering an area, for the purpose of charging. Advantageously, such a device would share the licence plate detection and licence plate recognition functionality between the existing system and the speed determination system.

The minimum number of images from which to make a speed determination is two. However, more than two images can be used. For example, data from multiple images can be used for the purpose of determining the size of a feature, or an estimate of speed can be based on a number of measurements.

As would be appreciated by the skilled person, although a look-up table is used in the preferred implementation of the above embodiments, the functionality of a look-up table can be achieved using a suitably designed function or algorithm.

It should be noted that the disclosed system can be used in combination with other speed detection mechanisms, such as timing the traversal between two induction loops, in order to meet the legal requirements for speed checking systems of providing two independent physical measurements of speed. Furthermore, the camera could be triggered by induction loops.

The invention claimed is:

1. A system for measuring the speed of a vehicle having a feature of known size, comprising:
   one or more cameras for capturing images of vehicles on a road;
   timing means for timing the capture of the images;
   a processor arranged to operate in at least a calibration mode and a monitoring mode,
   wherein:
   (i) in the calibration mode the processor:
      identifies in the captured images the feature of a vehicle;
      calculates the size in pixels of the feature of the vehicle in two or more of the captured images;
      receives as an input the vehicle's geodesic distance along the road at the times of capture of the captured images; and
      generates a look-up table or function correlating the calculated size of the feature to the vehicle's geodesic distance along the road; and
   (ii) in the monitoring mode the processor:
      identifies in the captured images the feature of the vehicle;
      calculates the size in pixels of the feature of the vehicle in two or more of the captured images;
      determines the vehicle's geodesic distance along the road in each image by using the calculated sizes as an input to the generated look-up table or function; and
      determines the speed of the vehicle based on the determination of the vehicle's geodesic distance along the road in each image and the times at which each image was captured.

2. A system as claimed in claim 1 wherein the processor is arranged to determine from at least one of the captured images a vertical position of the identified vehicle feature in the image and the speed of the vehicle is determined using the determined vertical position as an input to the look-up table or function.

3. A system as claimed in claim 1 wherein the processor is arranged to determine from at least one of the captured images a horizontal position of the identified vehicle feature in the image and the speed of the vehicle is determined using the determined horizontal position as an input to the look-up table or function.

4. A system as claimed in claim 1 which can measure the speed of a vehicle on a multi-lane road and in which the processor identifies which lane is occupied by the vehicle and the speed of the vehicle is determined from the captured images based upon the lane occupied by the vehicle.

5. A system as claimed in claim 1, comprising one camera which captures at least two images of the vehicle.

6. A system as claimed in claim 1, comprising more than one camera, each of which captures at least one image of the vehicle.

7. A system as claimed in claim 1, wherein:
in the calibration mode:
the one or more cameras capture(s) a plurality of images of a calibration vehicle which has distance of travel measuring means, the calibration vehicle comprising a part of the system when the system is operating in the calibration mode;
the plurality of images are captured for differing distances of the calibration vehicle from the camera(s);
the input means receives from the distance of travel measuring means inputs indicative of the geodesic distance along the road from the camera(s) to the calibration vehicle;
the processor identifies in the captured images a feature of the calibration vehicle;
the processor correlates each captured image with an indicated geodesic distance along the road;
the processor calculates the size in pixels of the feature of the vehicle in each captured image;
the processor generates a look-up table which stores the calculated sizes correlated to the indicated geodesic distances along the road, and
in the monitoring mode:
the one or more cameras capture(s) a plurality of images of a vehicle at a plurality of different known times;
the timing means records the times of the captured images;
the processor identifies in the captured images a feature of the vehicle;
the processor calculates the size in pixels of the feature of the vehicle in two or more of the captured images; and
the processor determines the speed of the vehicle from the two or more captured images using the calculated sizes to determine from the generated look-up table the geodesic distances along the road between the camera(s) and the vehicle, the processor calculating a distance of travel of the vehicle between the captured images and using the distance of travel and the times at which each image was captured to determine the speed of the vehicle.

8. A system as claimed in claim 1, wherein: for the vehicle, a pair of images are captured; and the speed of the vehicle is determined by: calculating the geodesic distance travelled along the road by the vehicle in a known period of time by determining the vehicle's geodesic distance along the road corresponding to the first captured image from the size in pixels of the feature in the first captured image, determining the vehicle's geodesic distance along the road corresponding to the second captured image from the size in pixels of the feature in the second captured image and the recorded times of image capture, and thereby determining the speed of the vehicle.

9. A system as claimed in claim 1, wherein:
the system is configured to operate in at least a calibration mode and a monitoring mode; and
in the calibration mode:
the one or more cameras capture(s) a plurality of images of a calibration vehicle which has distance of travel measuring means, the calibration vehicle comprising a part of the system when the system is operating in the calibration mode;
the plurality of images are captured for differing geodesic distances along the road of the calibration vehicle from the camera(s);
the input means receives from the distance of travel measuring means inputs indicative of the geodesic distance along the road from the camera(s) to the calibration vehicle;
the processor identifies in the captured images a feature of the calibration vehicle;
the processor correlates each captured image with an indicated geodesic distance along the road;
the processor calculates the vertical position and/or horizontal position of the feature of the vehicle in each captured image;
the processor calculates the size in pixels of the feature of the vehicle in each captured image;
the processor generates a look-up table which stores the calculated the vertical positions and/or horizontal positions and the calculated sizes correlated to the indicated geodesic distances along the road, and
in the monitoring mode:
the one or more cameras capture(s) a plurality of images of a vehicle at a plurality of different known times;
the timing means records the times of the captured images;
the processor identifies in the captured images a feature of the vehicle;
the processor calculates the vertical positions and/or horizontal positions of the feature of the vehicle in two or more of the captured images;
the processor calculates the size in pixels of the feature of the vehicle in the two or more of the captured images; and
the processor determines the speed of the vehicle from the two or more captured images using the calculated vertical positions and/or the calculated horizontal positions and the calculated sizes to determine from the generated look-up table the geodesic distances along the road between the camera(s) and the vehicle, the processor calculating a distance of travel of the vehicle between the captured images and using the distance of travel and the times at which each image was captured to determine the speed of the vehicle.

10. A system as claimed in claim 1, wherein the identified feature is a license plate of the vehicle.

11. A system as claimed in claim 10, wherein the calculated size in pixels of the license plate is the width in pixels of the license plate.

12. A system as claimed in claim 10, wherein the calculated size in pixels of the license plate is the length in pixels of a diagonal of the license plate.

13. A system as claimed in claim 10, wherein the calculated size in pixels of the license plate is the area in pixels of the license plate.

14. A system as claimed in claim 1 comprising a single camera.

15. A system as claimed in claim 7 comprising at least two cameras, wherein in the monitoring mode one or more of the at least two images is captured by the first camera and one or more other(s) of the at least two images is captured by the second camera.

16. A traffic monitoring system comprising:
- a system for measuring the speed of a vehicle according to claim 1, wherein the feature of the vehicle is a license plate;
- a license plate detector for detecting the license plate of a vehicle in the captured images; and
- an automatic license plate recognition system which reads characters in the license plate detected in each image.

17. A traffic monitoring system as claimed in claim 16, wherein the processor determines an aspect ratio of the detailed license plate and the step of determining the speed of the vehicle is also based in part on the determined aspect ratio.

18. A method of measuring the speed of a vehicle having a feature of known size, comprising:
- capturing a plurality of images of the vehicle;
- timing the capturing of the plurality of images;
- in a calibration mode:
  - identifying in the captured images the feature of the vehicle;
  - calculating the size in pixels of the feature of the vehicle in two or more of the captured images; and
  - generating a look-up table or function that correlates the calculated size of the feature to the vehicle's geodesic distance along the road to determine the vehicle's position on the road from each image; and
- in a monitoring mode:
  - identifying in the captured images the feature of the vehicle;
  - calculating the size in pixels of the feature of the vehicle in two or more of the captured images;
  - using the look-up table or function that correlates the calculated size of the feature to the vehicle's geodesic distance along the road to determine the vehicle's position on the road from each image; and
  - determining the speed of the vehicle using the determination of the vehicle's geodesic distance on the road from each image and the times at which each image was captured.

19. The method of claim 18, wherein: for the vehicle, a pair of images are captured; and the speed of the vehicle is determined by: calculating the distance travelled by the vehicle in a known period of time based on the size in pixels of the feature in the first captured image and the size in pixels of the feature in the second captured image, and thereby determining the speed of the vehicle.

20. The method of claim 19, wherein the known period of time is the period between the first image capture and the second image capture.

21. The method of claim 18, wherein the feature is a license plate of the vehicle.

22. The method of claim 21, wherein the calculated size in pixels of the license plate is the width in pixels of the license plate.

23. The method of claim 21, wherein the calculated size in pixels of the license plate is the length in pixels of a diagonal of the license plate.

24. The method of claim 21, wherein the calculated size in pixels of the license plate is the area in pixels of the license plate.

25. The method of claim 18, wherein the determination of the speed of the vehicle is also based on the vertical position in pixels of the feature in each image.

26. The method of claim 18, wherein the determination of the speed of the vehicle is also based on the horizontal position in pixels of the feature in each image.

27. The method of claim 18, wherein the first of the at least two images and the second of the at least two images are captured with the same camera.

28. The method of claim 18, wherein all images are captured with the same camera.

29. The method of claim 18, wherein the first of the at least two images and another of the at least two images are captured with different cameras.

* * * * *